United States Patent [19]

Coenen et al.

[11] 4,321,247

[45] Mar. 23, 1982

[54] PROCESS FOR PREPARING SODIUM BICARBONATE AND HYDROGEN CHLORIDE

[75] Inventors: Alfred Coenen, Maria Laach; Kurt Kosswig, Marl; Ferdinand v. Praun, Haltern; Hans Regner, Marl, all of Fed. Rep. of Germany

[73] Assignee: Chemische Werke Hüls AG, Marl, Fed. Rep. of Germany

[21] Appl. No.: 193,592

[22] Filed: Oct. 3, 1980

[30] Foreign Application Priority Data

Oct. 6, 1979 [DE] Fed. Rep. of Germany ....... 2940614
Aug. 19, 1980 [DE] Fed. Rep. of Germany ....... 3031252

[51] Int. Cl.$^3$ .......................... C01D 7/00; C01B 7/07
[52] U.S. Cl. ................... 423/424; 423/481; 423/488
[58] Field of Search ............... 423/422, 424, 481, 488

[56] References Cited

U.S. PATENT DOCUMENTS 4,115,530 9/1978 Coenen .............................. 423/488
4,230,681 10/1980 Coenen .............................. 423/488

OTHER PUBLICATIONS

Translation of Israeli Patent No. 33,552 to Blumberg et al. (1969).

Blumberg et al. in *Proceedings I.S.E.C.* 1974, Soc. Chem. Ind., London (1974) vol. III, pp. 2789-2802.
Bayles et al., in *J. Chem. Soc.* (1965) pp. 6984-6988.

*Primary Examiner*—Brian E. Hearn
*Attorney, Agent, or Firm*—Wells & Wells

[57] ABSTRACT

A process for producing sodium bicarbonate and hydrogen chloride by reacting an aqueous sodium chloride solution with carbon dioxide in the presence of an amine and an organic solvent. The steps of the process are carried out, wherein:

(1) carbon dioxide is introduced into a mixture containing essentially
  (1.1) an aqueous sodium chloride solution,
  (1.2) a tertiary amine, and
  (1.3) a polar, organic solvent;
(2) the aqueous and organic phases so obtained are separated;
(3) the aqueous phase freed from the separated sodium bicarbonate following reconcentration with sodium chloride is fed back into process stage 1 (carbonization stage);
(4) the organic phase (s) (is) are separated from the polar organic solvent and possibly of water to the widest possible extent and/or required; and
(5) the residue containing a non-polar solvent is heated and the hydrogen chloride is removed.

15 Claims, 1 Drawing Figure

| | | |
|---|---|---|
| 1 cascade vessels | 2 separator | $4_1$ forward extraction | $5_1$ cleavage column (thermolysis stage) |
| $1_1$ aqueous NaCl solution | 3 filtering of NaHCO$_3$ | $4_2$ column for separating water | |
| $1_2$ tertiary amine | | $4_3$ back extraction | $5_2$ adsorption column (removing of impurities) |
| $1_3$ polar organic solvent | | | |
| $1_4$ possibly non-polar solvent | | | |

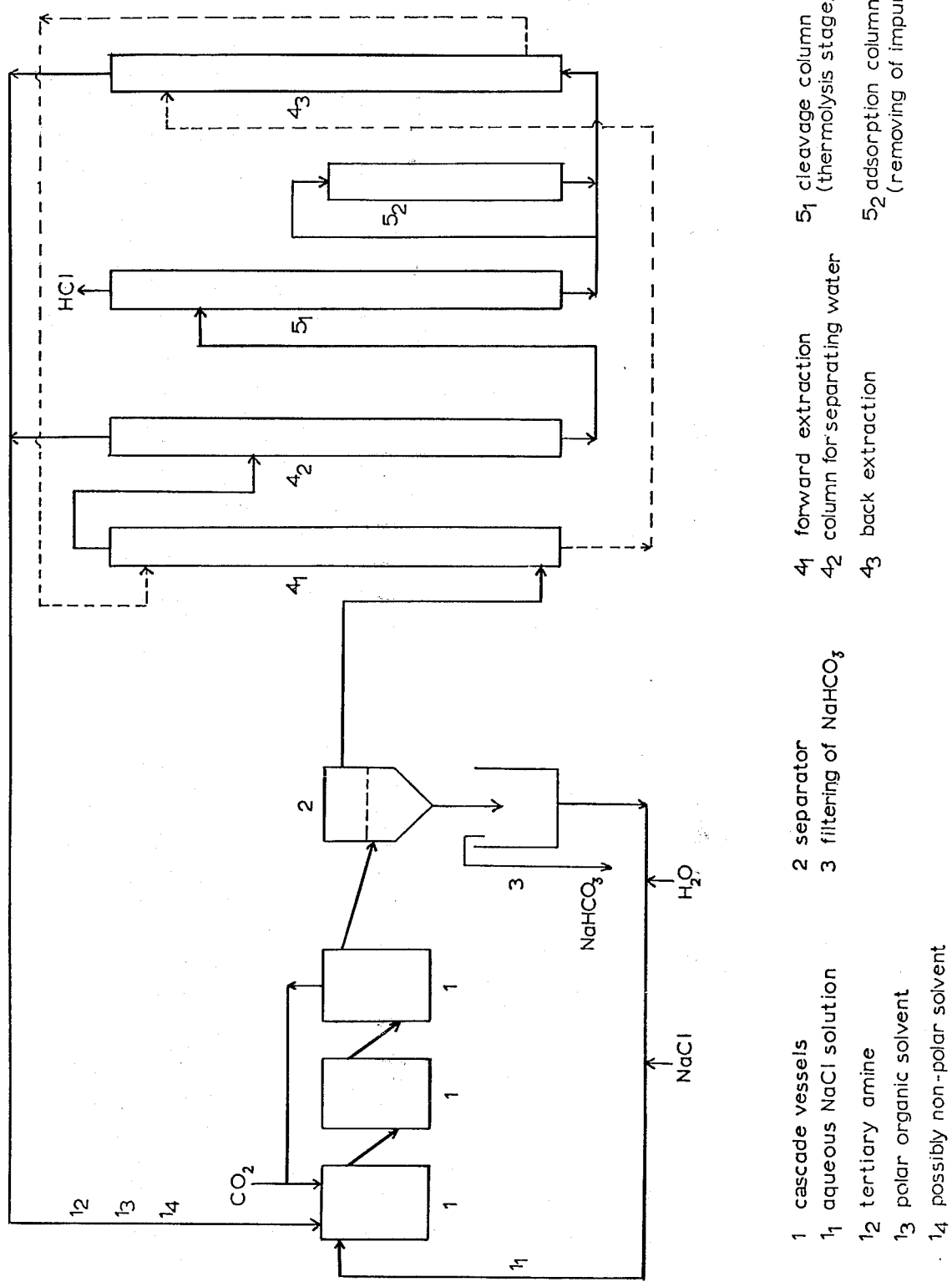

PROCESS FOR PREPARING SODIUM BICARBONATE AND HYDROGEN CHLORIDE

CROSS REFERENCE TO RELATED APPLICATIONS

Applicants claim priority under 35 USC 119 for application Nos. P 29 40 614.2 and P 30 31 252.8, filed Oct. 6, 1979 and Aug. 19, 1980, respectively, in the Patent Office of the Federal Republic of Germany.

The disclosures of assignee's copending U.S. patent applications, Ser. Nos. 10,048; 64,633 and 152,525, filed Feb. 6, 1979; Aug. 9, 1979 and May 22, 1980, respectively, now U.S. Pat. Nos. 4,230,681; 4,259,309; and 4,272,502, respectively, are incorporated herein to amplify individual process steps used in the present invention.

BACKGROUND OF THE INVENTION

The field of the invention is sodium bicarbonate production and the present invention is particularly concerned with the preparation of sodium bicarbonate and hydrogen chloride by reacting an aqueous sodium chloride solution with carbon dioxide in the presence of an amine and an organic solvent.

The state of the art of sodium bicarbonate production may be ascertained by reference to Israeli Pat. No. 33,552, U.S. Pat. No. 3,443,889 and the Kirk-Othmer "Encyclopedia of Chemical Technology", Second Edition, Vol. 1 (1963) page 734 and Vol. 18 (1969) page 467, the disclosures of which are incorporated herein.

Assignee's U.S. Pat. No. 4,115,530 is incorporated herein to amplify one of the process steps used in the present invention.

A major part of the world production of sodium carbonate is by calcining sodium bicarbonate which is obtained in the Solvey process as an intermediate product from the equation:

$$NaCl + CO_2 + H_2O + NH_3 \rightarrow NaHCO_3 + NH_4Cl$$

Ammonium chloride is obtained in addition. The ammonia as a rule is recovered from the ammonium chloride by being treated with burnt lime. Large amounts of calcium chloride are also obtained, which together with the unconverted sodium chloride are fed as waste liquor to the sewer system. The drawback of the Solvay process essentially is therefore that all of the chlorine of the reacted sodium chloride is lost in the form of worthless calcium chloride, and that furthermore the unconverted sodium chloride also is lost.

Similar to the case for the Solvay process, the chlorine of the starting material also is lost as disclosed in the method of U.S. Pat. No. 3,443,889 whereby for instance alkali carbonates are prepared from alkali chlorides and carboxylic acid in the presence of a strongly basic amine dissolved in an organic solvent. From the aminohydrochloride that is formed, only the amine is recovered by treating the organic phase with an alkalinically active reagent for the purpose of feeding it back into the process.

Israeli Pat. No. 33 552 discloses the preparation of sodium bicarbonate and hydrogen chloride in a variation of the Solvay process by first treating a heterogeneous mixture of an amine dissolved in a polar organic solvent and a sodium chloride solution with carbon dioxide in a gaseous phase at pressures up to 9 atmospheres. The sodium bicarbonate precipitates from the aqueous phase, the aminohydrochloride produced remains dissolved in the organic phase and is removed. Thereupon, the amine is regenerated from its hydrochloride by treatment with aqueous magnesium hydroxide, the aqueous magnesium chloride obtained then is decomposed at temperatures up to about 500° C. with the formation of magnesium oxide, magnesium oxichloride and hydrogen chloride. Depending on the process conditions, the hydrogen chloride, however, is not exclusively water-free, and therefore it can be used only to a limited extent for industrial purposes. A further drawback of this method is the high temperature required in the production of hydrogen chloride, the increased danger of corrosion related thereto and the use of magnesium salts as additional accessories.

SUMMARY OF THE INVENTION

Having in mind the limitations of the prior art, it is an object of the present invention to develop an economical and ecological process for the manufacture of sodium bicarbonate and hydrogen chloride from sodium chloride and carbonic acid.

Another object of the present invention is to obtain the hydrogen chloride under milder and industrially simpler conditions than by the method of Israeli Pat. No. 33 552.

Still another object of the present invention is to obtain the product in water-free form.

The objects of the present invention are achieved by a process for producing sodium bicarbonate and hydrogen chloride by reacting an aqueous sodium chloride solution with carbon dioxide in the presence of an amine and an organic solvent, wherein:

(1) carbon dioxide is introduced into a mixture containing essentially:
 (1.1) an aqueous sodium chloride solution,
 (1.2) a tertiary amine, and
 (1.3) a polar, organic solvent;
(2) the aqueous and organic phases so obtained are separated;
(3) the aqueous phase freed from the separated sodium bicarbonate following reconcentration with sodium chloride is fed back into process stage 1 (carbonization stage);
(4) the organic phase(s) (is) are separated from the polar organic solvent and possibly of water to the widest possible extent and/or required; and
(5) the residue containing a non-polar solvent is heated and the hydrogen chloride is removed.

BRIEF DESCRIPTION OF THE DRAWING

The FIGURE of the drawing is a flow sheet illustrating the steps of the present process.

DESCRIPTION OF THE PREFERRED EMBODIMENTS

The starting point for process stage 1, also termed hereafter the carbonization stage, is a mixture containing essentially an aqueous sodium chloride solution, a tertiary amine and a polar organic solvent. A non-polar solvent is possibly contained in the mixture. Further components, for instance, are given amounts of dissolved and undissolved sodium bicarbonate, undissolved sodium chloride and active (causing the decomposition of tertiary amine) and inactive amine dissociation products.

The amines are used singly or in mixtures and are those for which the basicity can be adjusted so that they form hydrochlorides, both in the carbonization stage and in the thermolysis stage (process stage 5), split off hydrogen chloride at a sufficient rate in the most complete manner possible, excessive temperatures (greater than 300° C.) being prohibited in order to avoid amine dissociation. It is found that these requirements are met in general on the one hand by tertiary, non-aromatic amines which contain a total of 14 to 39 C atoms in the nitrogen-bound ligands, where all side chains may be unbranched and primary but including at most one methyl group or where the unbranched primary side chains are replaced in whole or in part by branched primary ones provided that the branch point is at least 3 C atoms away from the central nitrogen atom, or where two of the side chains are branched and primary with the branching in the 2-position and the third side chain is unbranched and primary, or where one side chain is branched and primary with the branching in the 2-position while the other side chains either are both unbranched and primary or only one is unbranched and primary and the other is unbranched and secondary or alicyclic, or where two of the unbranched and primary side chains are replaced by cyclohexyl groups and on the other hand by mixtures of other tertiary non-aromatic amines having 14 to 39 C atoms in which the above defined amines are present in excess by weight.

Suitable amines for instance are trihexylamine, trioctylamine, trilaurylamine, tri-(3,5,5-trimethylhexyl)-amine, tri-(3,5,5-trimethyloctyl)-amine, tri-(3,5,5-trimethyldecyl)-amine, N-octyl-di-(2-ethylhexyl)-amine, N,N-dioctyl-(2-ethylhexyl)-amine, N-octyl-N-(2-ethylhexyl)-cyclohexylamine, N-octyldicyclohexylamine and N-hexadecyldicyclohexylamine.

In a further development of the present invention, it is found that N-alkyl-azacycloalkanes with a total of at least 14 C atoms can also be used as the tertiary amines. The general formula for such amines is

where n is an integer from 4 to 12, R is an alkyl group with a maximum of 18 C atoms and where the methylene groups may be substituted by alkyl groups with a maximum of 6 C atoms in the sum of the alkyl groups.

Suitable N-alkyl-azacycloalkanes for instance are N-dodecyl-pyrrolidine, N-hexadecyl-pyrrolidine, N-octadecyl-pyrrolidine, N-dodecyl-piperidine, N-tetradecyl-piperidine, N-hexadecyl-piperidine, N-octadecyl-piperidine, N-octyl-azacycloheptane, N-dodecyl-azacycloheptane, N-octadecyl-azacycloheptane, N-octyl-3,3,5-trimethylazacycloheptane, N-octyl-3,5,5-trimethylazacycloheptane, N-dodecyl-3,3,5-trimethylazacycloheptane, N-dodecyl-3,5,5-trimethylazacycloheptane, N-octadecyl-3,5,5-trimethylazacycloheptane, N-octyl-azacyclononane, N-dodecyl-azacyclononane, N-octadecyl-azacyclononane, N-hexyl-azacyclotridecane, N-octyl-azacyclotridecane, N-dodecyl-azacyclotridecane and N-octadecyl-azacyclotridecane.

It is quite feasible to use other amines outside of the ones defined above in combination with selected polar organic solvents in the method of the present invention. For instance, the carbonization reaction also succeeds using tri-2-ethylhexylamine and tricyclohexylamine with, for instance, phenol, 2,2,2-trichloroethanol and 2,2,2-trifluoroethanol as polar organic solvents. These amines therefore should be considered typical but neither optimal nor as limiting.

The polar organic solvents which are used singly or in mixtures in the process of the present invention as a rule are characterized by a dipole moment greater than zero (see LANDOLT BOERNSTEIN, Physikalische-chemische Tabellen, 5th ed., 2nd supplemental vol., 1931, pp. 74–6). Especially preferred are polar organic solvents with a dipole moment greater than 0.7 debyes. Furthermore, the polar organic solvents should be capable of exerting a positive effect on hydrochloride formation. That is, the polar organic solvent is chosen foremost with respect to the amine used and the overall process so that the aminohydrochloride is formed in sufficient yield in process stage 1. Furthermore, the organic polar solvent is selected so that in the further course of the process, that is prior to the dissociation of aminohydrochloride it can be removed from the organic phase(s) in the most simple and economical manner possible.

Suitable polar organic compounds are selected from the various classes of compounds (alcohols, esters, ethers, amides, aldehydes, ketones, substituted alkanes, substituted aromatics, etc.) and for instance, are methanol, ethanol, propanols, butanols, pentanols, 2-ethylhexanol, decanol, cyclohexanol, 1,4-bis-(hydroxymethyl)-cyclohexane, 2,2,2-trichloroethanol, 2,2,2-trifluoroethanol, ethylenechlorohydrin, propylenechlorohydrin, furfuryl alcohol, glycols such as neopentyl glycol, ethylacetate, diisobutylether, dioxane, tetrahydrofuran, ethyleneglycolmonobutylether, diethyleneglycolmonobutylether, N,N-dimethylformamide, N,N-dimethyl acetamide, acetone, acetylacetone, heptanone-(4), cyclohexanone, 1,2-dichloroethane, nitromethane, nitrobenzene, benzonitrile, phenol, cresols and xylenols. Most preferred of all as polar organic solvents when implementing the process of the present invention are the aliphatic alcohols with 3 or 4 C atoms such as n-propanol, isopropanol, n-butanol, isobutanol, sec. butanol, tert. butanol, butene-(1)-ol-(3) and butene-(2)-ol-(1), cycloaliphatic alcohols such as cyclopentanol and cyclohexanol, 1,4-bis-(hydroximethyl)-cyclohexane, chloroalcohols such as ethylene chlorohydrin and propylene chlorohydrin, araliphatic alcohols such as furfuryl alcohol, glycols such as ethylene glycol, neopentyl glycol, esters such as propylene carbonate, ethers such as ethyleneglycolmonomethylether, ethyleneglycolmonobutylether, diethyleneglycolmonobutylether, dioxane and tetrahydrofuran, amides such as formamide, N,N-dimethylacetamide and hexamethyl phosphoric acid triamide, aldehydes such as furfurol, ketones such as acetone, acetylacetone and cyclohexanone, phenol and dimethylsulfoxide.

Besides the polar organic solvent critical to the process stage 1, such non-polar solvent or mixture of solvents can be used in the carbonization stage of the process of the present invention that anyway would have to be added to it later prior to the aminohydrochloride dissociation. Suitable non-polar solvents from the group of the aromatic, araliphatic and aliphatic hydrocarbons generally having a boiling point above 140° C. and preferably above 170° C. and which for the given conditions of reaction are widely inert to water, hydrogen chloride, amines and temperature stresses for instance, are cymols, 1,2,3-trimethylbenzene, 1,2,4-trimethylbenzene, 1,2,4-triethylbenzene, 1,3,5-triethylbenzene, 1,2,3,4-tetramethylbenzene, 1,2,3,5-tetramethylbenzene, 5-tert.-butyl-m-xylene, 3-phenylpentane, dodecylbenzene, decane, undecane, dodecane, tetradecane, Decalin and Tetralin. Polar organic solvents also can be used in lieu of non-polar solvents when they also have a boiling point exceeding 140° C. and are inert or extensively so with respect to water, hydrogen chloride, amines and thermal stresses under thermolysis. Illustrative among these are: diphenylether, dinaphthylether, phenylnaphthylether, o-,m-dichlorobenzene. The term "non-polar solvent" accordingly covers also the group of these special polar solvents.

In order to achieve optimal conversions in process stage 1, the sodium chloride solution appropriately is used in the saturated form, and a significant decrease in concentration is prevented during reaction. The quantitative ratio (ratio of the weights) of the organic phase(s) used, consisting of amine, polar and non-polar organic solvent, to the aqueous sodium chloride solution is limited on the one side by the drop in yield due to the decrease in the sodium chloride concentration by the reaction, and on the other side by the loss, even if minute, of the amine through the sol. The former can be prevented, for instance, by adding solid sodium chloride to the reaction vessel, while a loss of amine is prevented by circulating the sol over an NaCl saturator. As a rule, an advantageous quantitative ratio of the organic phase(s) to the sol is from about 6/1 to 0.5/1, preferably 4/1 to 1/1.

The weight ratio of the polar organic solvent or of the mixture of polar and non-polar organic solvents to the amine is varied in the present process within the limits from about 10/1 to 0.2/1, preferably from 5/1 to 0.5/1. The composition of any mixture of solvents consisting of polar and non-polar organic solvents on the one hand depends on the magnitude of the conversion in the carbonization stage and on the other, how much non-polar solvent is present at the output of process stage 5 (thermolysis stage). It may be appropriate for instance to adjust a certain non-polar solvent concentration in the sump of the dissociating column in order to prevent excessive thermal stress on the amine. The same purpose, however, is also achieved by hydrochloride dissociation in a vacuum, which requires the absence of significant amounts of solvents in the sump of the dissociation columns. It is easy to ascertain by a few trial-and-error steps which composition of the mixture of solvents is best suited to the particular case. Appropriately, however, the non-polar solvent should not exceed the polar organic solvent in quantity. If, for instance, trioctylamine is used as the amine in a mixture of solvents of isopropanol and dodecane, good yields are possible by setting a weight ratio in the cited sequence of 1/1/1, better yet of 1/1/0.5 or 1/2/0.5.

When carrying out the process of the present invention, th procedure as a rule is such that for some time carbon dioxide is introduced into the mixture, which essentially contains an aqueous sodium chloride solution, a water-insoluble amine, a polar organic solvent and possibly a non-polar solvent. The type and the amounts of the components of the organic phase(s) are determined in one or more test runs. Attention is paid during the introduction of the carbon dioxide and possibly also some time after that the individual phases are thoroughly mixed, for instance, using an agitator or a strong gas jet. For improving the yield, the carbonization stage temperatures are less than 25° C., the lower temperature limit being determined by the dew point of the carbon dioxide, the crystallization of the solvents, amine or aminohydrochloride. The general temperature range for process stage 1 is about $-10°$ to $+25°$ C.

As a rule, the process of the present invention is carried out in process stage 1 in unpressurized manner; however, it is also possible to operate under pressure, preferably $CO_2$ pressure. The pressure is selected so that the dew point of the carbon dioxide shall not be reached. A general pressure range for process stage 1 is about 0.1 to 40 bars.

When using a non-polar solvent, it may happen, depending on the kind of polar organic solvent and the magnitude of the conversion, that also two organic phases are formed, which then are separated together in process stage 2 from the remaining phases (aqueous phase), solid sodium bicarbonate and gas phase).

As a rule, the separation of the phases is carried out so that the reaction mixture is introduced into a suitable apparatus which evacuates carbon dioxide containing possibly inert gases (nitrogen, argon) at the head and the suspension of sodium bicarbonate in the so-called poor sol at the lower part of the separating means. There remains the organic phase, consisting essentially of aminohydrochloride, amine, polar organic solvent and possibly non-polar solvent.

The evacuated carbon dioxide is fed directly back into processing stage 1 together with the aqueous phase freed by separation methods such as filtration or centrifuging from the solid sodium bicarbonate but only after reconcentration with sodium chloride (process stage 3). The initially moist sodium bicarbonate, where appropriate, is rid of the adhering water by gentle drying or calcined, the water together with the dissociated carboxylic acid being removed and in general being fed to the carbonization stage.

Then the organic phase is freed in process stage 4 from the polar organic solvent and possibly also from any water present for instance, by extraction and/or distillation to the extent possible and/or required. The removal of the water is required only when exclusively gaseous hydrogen chloride is to be obtained from the ensuing dissociation of amino hydrochloride.

Before the residue from the process stage 4 is heated to dissociate hydrogen chloride from the aminohydrochloride (process stage 5) attention is paid that it receive the required amount of a suitable non-polar solvent unless this already was done in process stage 1 or a subsequent step. As a rule from 5 to 0.1 parts by weight, preferably 3 to 0.2 parts by weight of non-polar solvent per part by weight of amine (the total of free amine and amine bound as hydrochloride) are used. The implementation of the thermal decomposition of the aminohydrochloride is carried out as disclosed in U.S. Pat. No. 4,115,530 or in U.S. Pat. No. 4,230,681. In the process of U.S. Pat. No. 4,115,530, the solution of the aminohydrochloride, possibly containing free amine, is boiled in a vessel provided with a column, and the solvent has a boiling point 20° or more below the boiling point of the amine. At the top of the column, the vapors consisting mostly of the solvent are condensed in conventional manner and are fed as reflux to the column, the hydrogen chloride contained in the vapors and not dissolved by the solvent simultaneously escaping from the condensing zone. To accelerate the formation of hydrogen chloride, the hydrogen chloride split off is expanded to a lesser pressure after the condenser, or is removed using a flow of inert gas. Suitable inert gases are nitrogen and further, for the particular conditions existing, gaseous materials such as ethylene, which subsequently are converted with the hydrogen chloride.

In the process of U.S. Pat. No. 4,230,681, the hydrogen chloride is recovered from the aminohydrochloride so that the aminohydrochloride is heated in the non-polar solvent to 100° to 250° C. with a flow of inert gas. The temperature within this range which is advantageous depends on the kind and amount of the amine and non-polar solvent. Advantageously, the non-polar solvent has a relative low vapor pressure at the dissociation temperature, that is, its boiling point is at least 20° C. above the dissociation temperature, so as to minimize the vapor outflow into the flow of inert gas.

The hydrogen chloride is easily produced in pure manner from the mixture of inert gas and hydrogen chloride using methods such as adsorption, however, this separation, depending on the application of the hydrogen chloride, is not always required. If for instance, ethylene is used as the carrier gas, then the gas mixture so produced is used directly for synthesizing chlorethanes.

A preferred embodiment of the process of the present invention consists in removing small amounts of impurities such as primary and secondary amines, produced mostly by the thermal stressing of the mixture of tertiary amine and non-polar solvent, from the sump of the process stage 5, before reintroducing hydrogen chloride at a suitable location into the process.

The separation of the undesired impurities for instance, may be carried out as disclosed in U.S. Pat. Nos. 4,259,309 and 4,272,502. In the case of the process of U.S. patent 4,259,309, the mixture of amine, solvent and possibly impurities is made to pass in whole or in part over an adsorbing agent such as aluminum oxide, silica gel or silanized silica gel. In the process of U.S. Pat. No. 4,272,502, on the other hand, the primary and secondary amines formed are inactivated by being reacted with carboxylic acid chlorides.

A further preferred implementation of the process of the present invention is characterized in that the organic phase(s) in process stage 4 are freed from the polar organic solvent to a high degree by extraction with water or an aqueous salt solution (forward extraction), by back-extracting from the process stage 5 the polar organic solvent from the extract using the sump product (back-extraction), by feeding back the mixture of amine, non-polar and polar organic solvent to the process stage 1, and by using the refined product of the back-extraction again in the forward extraction.

The extraction of the polar organic solvent from the organic phase(s) is carried out with water as the extracting means. This so-called forward extraction takes place at as low a temperature as possible in order to achieve a high rate of extraction. As a rule, the forward extraction is carried out at temperatures from about 0° to +50° C., preferably +5 to +30° C. The temperature limits ultimately, however, are set by the solidification point of the mixture to be extracted and of the extracting means. Economic considerations are also considered.

The recovery of the polar organic solvent from extract I of the forward extraction is implemented by extracting with a HCl-free mixture of amine and non-polar solvent, following the hydrochloride dissociation, leaves the thermolysis stage. The temperature of this so-called back-extraction should be as high as possible in order to obtain an optimum efficiency, the limits being set by the system pressure, energy costs and product stability. As a rule, the back-extraction is carried out at temperatures from about +30° to +250° C., preferably +50° to +150° C. Extract II containing the two organic solvents and the amine is fed back to the carbonization. The refined substance (water or aqueous salt solution) which is extensively freed from the polar organic solvent in the back extraction is again used for the forward extraction.

It is found appropriate not to use pure water in the forward extraction, rather aqueous solutions or inorganic salts such as sodium chloride or calcium chloride as the extractant. The concentrations of these sols in these cases is between about 0 and 30%, preferably 5 and 20%. The salt content displaces the equilibrium distribution of the polar organic solvent for the back extraction into a favorable direction, and for the forward extraction into an adverse direction. There is an optimum salt concentration for which the improvement in the back extraction is more pronounced than the corresponding degradation of the forward extraction. This optimum is easily ascertained by a few trial runs. Further, a certain salt content in the extractant is useful to improve the phase separation behavior. A salt already used in the form of a concentrated sol in the carbonization stage is recommended; that is, in the case of the sodium bicarbonate production, sodium chloride is used. In this manner sol contamination by foreign salts is avoided.

The described extractive exchange of solvents is carried out for instance in the form of countercurrent extractions with several theoretical stages, where 6 to 10 stages are used industrially.

The process of the present invention can be carried out both discontinuously and continuously.

The sodium bicarbonate produced in the process of the present invention is used foremost for making sodium carbonate and the hydrogen chloride obtained thereby is used in producing hydrochloric acid or chlorinated hydrocarbons such as vinylchloride.

The process of the present invention also can be used for making potassium bicarbonate and hydrogen chloride from potassium chloride and carboxylic acid.

All percentage data in the examples below which illustrate the process of the present invention, unless otherwise indicated, are % by weight.

EXAMPLE 1

In a cylindrical reaction vessel with thermostat, and with strong stirring, *Ultra-Turrax by Janke & Kunkel KG), 125 g (0.35 moles) of trioctylamine, 125 g of ethanol and 204 g of saturated aqueous sodium chloride solution (0.92 moles of NaCl) are gassed for one hour with a large excess of carbon dioxide, the temperature being 20° C. The sodium bicarbonate formed is isolated by filtration and obtained in an amount of 28.4 g, corresponding to a yield of 96% with respect to the amine.

The organic phase (199 g) separated from the filtered substance contains amine, aminohydrochloride, water and about half of the ethanol used. The other half of the polar organic solvent is in the poor sol separated as the aqueous phase.

After addition of 200 g of dodecane, the organic phase is rid of water and ethanol by distillation and thereupon fed into a column for thermolyzing the hydrochloride, the dissociation taking place at temperatures between 214 and 230° C. 12.3 g of hydrogen chloride are removed through the head of the dissociation column, while the trioctylamine mixed with dodecane is recovered as a sump product.

EXAMPLE 2

162.5 g (0.46 moles) of trioctylamine, 81.3 g of isopropanol, 81.3 g of dodecane, 245 g of saturated aqueous sodium chloride solution (1.1 moles of NaCl) and 56 liters (2.5 moles) of carbon dioxide are fed per hour into a cylindrical reaction vessel with thermostat (contents: 2 liters) with strong stirring at 10° C. To complete the reaction, the mixture while being stirred is made to pass through two further cascaded vessels and then decomposed into four phases in a 5 liter separation vessel. Carbon dioxide is removed at the head and recirculated. A suspension of sodium bicarbonate in poor sol is removed from the lower conically tapering part of the separation vessel by means of a screw conveyor. The separation of the salt by filtration yielded 30.1 g of sodium bicarbonate an hour. The poor sol following reconcentration in an NaCl saturator is fed back to the cascade of stirring vessels.

Above the aqueous phase containing solids, an organic layer separated in the separation vessel consists of 11.6% of trioctylamine, 45.3% of trioctylamine hydrochloride, 14.1% of isopropanol, 26.3% of dodecane and 2.7% of water. The organic phase is to the largest extent rid of isopropanol and water by vacuum distillation. Thereupon, the thermolysis of the hydrochloride took place in a dissociation column at temperatures between 214 and 260° C. 13 g of gaseous hydrogen chloride an hour are removed through the head, while the sump product is a mixture of trioctylamine and dodecane. This mixture then is made to pass through a purification column filled with aluminum oxide wherein primary and secondary amines and their hydrochlorides and other decomposition products are adsorptively bound. The amine thus purified and mixed with dodecane is fed back into the carbonization stage.

In the course of 1,005 hours, 13,065 g (358.2 moles) of hydrogen chloride and 30,250.5 g (360.0 moles) of sodium bicarbonate, corresponding to a yield of 78% referred to the amine carried through are produced.

EXAMPLE 3

Similar to Example 2, 153.8 g (0.43 moles) of trioctylamine, 153.8 g of isopropanol, 153.8 g of dodecane, 244 g of saturated aqueous sodium chloride solution (1.1 moles of NaCl) and 52.9 g (2.4 moles) of carbon dioxide per hour are reacted in the stirring vessel cascade of the carbonization stage at 12° C. After the phase separation, about 27 g/h of sodium bicarbonate are obtained.

The separated organic phase contains 8.3% of trioctylamine, 26.2% of trioctylamine hydrochloride, 29.5% of isopropanol, 32.0% of dodecane and 3.9% water. The hourly extraction (forward extraction) in counterflow and at 12° C. is 479.8 g of organic phase with 488 g of 10% aqueous sodium chloride solution in a column (DN 50×3000) filled with Berl saddles 4 mm in size. The isopropanol is extracted to 65% from the organic phase and the residual amount and the water are removed by distillation in a dehydration column.

Thereupon, the thermolysis of the hydrochloride takes place in a dissociation column at temperatures between 214° and 240° C. 11.8 g of hydrogen chloride an hour are removed through the head, while 307 g of a mixture of 50% trioctylamine and 50% dodecane are simultaneously obtained as the sump product. Thereupon this mixture is made to pass through an adsorption column filled with aluminum oxide to remove the decomposition products.

To recover the isopropanol, 580 g of the extract from the forward extraction are extracted with 307 g of the trioctylamine/dodecane mixture from the purification stage in a column filled with 4 mm Berl saddles (DN 50×3000) in counterflow at 120° C. (back extraction) per hour. The rate of extraction in this case is 66%. The extract consisting of amine, dodecane and isopropanol is fed back into the carbonization stage. A total of 43% of the isopropanol contained in the organic phase of the carbonization stage is removed extractively in the manner described.

This distillate from the dehydration column, which besides water also contains the portion of isopropanol not separated in the forward extraction, is fed back into the carbonization stage.

In the course of 835 hours, 9,749 g (267.2 moles) of hydrogen chloride and 22.604.5 g (269.0 moles) of sodium bicarbonate corresponding to a yield of 74% referred to the amine carried through were produced.

EXAMPLES 4 THROUGH 8

0.6 moles of tertiary amine per Table 1, 154 g of isopropanol, 154 g of dodecane, 244 g of saturated aqueous sodium chloride solution (1.1 moles of NaCl) and 56 liters (2.5 moles) of carbon dioxide are introduced into a cylindrical 2 liter reaction vessel with thermostat facilities, with vigorous stirring, at 12° C., per hour. In order to complete the reaction, the mixture while being stirred passed through two further vessels in cascade, and then decomposed into four phases in a 5 liter separation vessel. Carbon dioxide is removed at the top, and recirculated. A suspension of sodium bicarbonate in a weak sol is removed by means of a screw conveyor from the lower conically tapering part of the separation vessel and the solid is removed by filtration. The weak sol obtained as filtrate is fed back, following reconcentration in a NaCl saturator, into the cascade of agitator vessels.

Among the aqueous phase containing solids, an organic layer is separated in the separation vessel, containing in addition to unconverted amine also aminohydrochloride, isopropanol, dodecane and water. The organic phase is extracted in counterflow at 12° C. with about the same amount by weight of a 10% aqueous sodium chloride solution in a column 50×3000 in size (German standards) and filled with 4 mm Berl saddles (forward extraction). The isopropanol is extracted up to 60-70% from the organic phase and the residual amount and also the water are removed by distillation in a dehydration column.

The thermolysis of the hydrochloride takes place thereafter in a decomposition column at temperatures between 214° and 240° C. The hydrogen chloride is removed through the head, while a mixture of 50% amine and 50% dodecane is obtained as the sump product. This mixture thereupon is passed through an adsorption column filled with aluminum oxide in order to remove dissociation products.

In order to recover the isopropanol, the extract from the forward extraction is extracted in counterflow at 120° C. with the amine-dodecane mixture from the purification stage in a column DN 50×3000 in size (German standards) filled with Berl saddles (back extraction). The extraction rate in this case is between 60 and 70%. The extract consisting of amine, dodecane and isopropanol is fed back into the carbonization stage.

The distillate from the dehydration column, which in addition to water also contains the isopropane part not separated in the forward extraction, is fed back into the carbonization stage.

The results from the particular process stages are listed in the following Table 1.

TABLE 1

| Example | Amine | Active time (hr) | Yield in HCl (mol) | Yield in NaHCO₃ (mol) | NaHCO₃ Yield referred to the amine (%) |
|---|---|---|---|---|---|
| 4 | N-dodecylpiperidine | 1003 | 320.8 | 321.3 | 53.4 |
| 5 | N-octyl-azacycloheptane | 935 | 405.1 | 407.5 | 72.7 |
| 6 | N-dodecyl-azacycloheptane | 610 | 243.1 | 244.1 | 66.7 |
| 7 | N-octyl-3,3,5(3,5,5)-trimethylazacycloheptane | 890 | 371.9 | 373.4 | 69.9 |
| 8 | N-dodecyl-3,3,5(3,5,5)-trimethylazacycloheptane | 739 | 221.7 | 222.9 | 50.3 |

We claim:

1. In a method for producing sodium bicarbonate and hydrogen chloride by reacting an aqueous sodium chloride solution with carbon dioxide in the presence of an amine and an organic solvent, the improvement comprising:
   (a) introducing said carbon dioxide into a mixture comprising
      (A) said aqueous sodium chloride solution,
      (B) said amine comprising a tertiary amine, and
      (C) said organic solvent comprising at least one polar, organic solvent to produce an aqueous phase and at least one organic phase;
   (b) separating said aqueous phase and said organic phase;
   (c) separating said sodium bicarbonate from said aqueous phase, reconcentrating said separated aqueous phase with sodium chloride and feeding back said reconcentrated aqueous phase into step (a); and
   (d) separating said hydrogen chloride from said organic phase by heating.

2. The method of claim 1, further comprising the addition of a non-polar solvent prior to separating said hydrogen chloride.

3. The method of claim 2, further comprising separating said polar organic solvent prior to separating said hydrogen chloride.

4. In a method for producing sodium bicarbonate and hydrogen chloride by reacting an aqueous sodium chloride solution with carbon dioxide in the presence of an amine and an organic solvent, the improvement comprising:
   (a) introducing said carbon dioxide into a mixture comprising
      (A) said aqueous sodium chloride solution,
      (B) said amine comprising a tertiary amine,
      (C) said organic solvent comprising at least one polar, organic solvent;
      (D) said organic solvent comprising at least one non-polar, organic solvent, to produce an aqueous phase and at least one organic phase;
   (b) separating said aqueous phase and said organic phase;
   (c) separating said sodium bicarbonate from said aqueous phase, reconcentrating said separated aqueous phase with sodium chloride and feeding back said reconcentrated aqueous phase into step (a);
   (d) separating said polar, organic solvent from said organic phase, and
   (e) separating said hydrogen chloride from said organic phase containing said non-polar organic solvent and free of said polar organic solvent by heating.

5. The method of claim 1, wherein decomposition products accumulating in step (e) are removed or inactivated therein prior to being fed into step (a).

6. The method of claim 4, wherein said tertiary amine is a N-alkyl-azacyloalkane with a total of at least 14 C atoms having the general formula

wherein n is an integer from 4 to 12, R is an alkyl group with 1-18 carbon atoms and where any methylene groups may be substituted by alkyl groups having a maximum of 6 carbon atoms in the total sum of alkyl groups.

7. The method of claim 6, wherein said amines of the general formula are selected from the group consisting of N-dodecyl-pyrrolidine, N-hexadecyl-pyrrolidine, N-octadecyl-pyrrolidine, N-dodecyl-piperidine, N-tetradecyl-piperidine, N-hexadecyl-piperidine, N-octadecyl-piperidine, N-octyl-azacycloheptane, N-dodecyl-azacycloheptane, N-octadecyl-azacycloheptane, N-octyl-3,3,5-trimethylazacycloheptane, N-octyl-3,5,5-trimethylazacycloheptane, N-dodecyl-3,3,5-trimethylazacycloheptane, N-dodecyl-3,5,5-trimethylazacycloheptane, N-octadecyl-3,5,5-trimethylazacycloheptane, N-octyl-azacyclononane, N-dodecyl-azacyclononane, N-octadecyl-azacyclononane, N-hexyl-azacyclotridecane, N-octyl-azacyclotridecane, N-dodecyl-azacyclotridecane and N-octadecyl-azacyclotridecane.

8. The method of claim 4, wherein said tertiary amine is a non-aromatic amine having 14 to 39 C atoms in the nitrogen-bound ligends, where all side chains may be unbranched and primary but including at most one methyl group or where the unbranched primary side chains are replaced in whole or in part by branched primary side chains provided that the branch point is at least 3 C atoms away from the central nitrogen atom, or where two of the side chains are branched and primary with the branching in the 2-position and the third side chain is unbranched and primary, or where one side chain is branched and primary with the branching in the 2-position while the other side chains either are both unbranched and primary or only one is unbranched and primary and the other is unbranched and secondary or alicyclic, or where two of the unbranched and primary side chains are replaced by cyclohexyl groups and on the other hand by mixtures of other tertiary non-aromatic amines having 14 to 39 C atoms in which the above defined amines are present in excess by weight.

9. The method of claim 8 wherein said tertiary amine is selected from the group consisting of trihexylamine, trioctylamine, trilaurylamine, tri-(3,5,5-trimethylhexyl)-amine, tri-(3,5,5-trimethyloctyl)-amine, tri-(3,5,5-trimethyldecyl)-amine, N-octyl-di-(2-ethylhexyl)-amine, N,N-dioctyl-(2-ethylhexyl)-amine, N-octyl-N-(2-ethylhexyl)-cyclohexylamine, N-octyldicyclohexylamine and N-hexadecyldicyclohexylamine.

10. The method of claim 8, wherein step (e) is carried out at a temperature of about 100° to 250° C.

11. In a method for producing sodium bicarbonate and hydrogen chloride by reacting an aqueous sodium chloride solution with carbon dioxide in the presence of an amine and an organic solvent, the improvement comprising:
(a) introducing said carbon dioxide into a mixture comprising
 (A) said aqueous sodium chloride solution,
 (B) said amine comprising a tertiary amine,
 (C) said organic solvent comprising at least one polar, organic solvent,
 (D) said organic solvent comprising at least one non-polar, organic solvent to produce an aqueous phase and at least one organic phase;
(b) separating said aqueous phase and said organic phase;
(c) separating said sodium bicarbonate from said aqueous phase, reconcentrating said separated aqueous phase with sodium chloride and feeding back said reconcentrated aqueous phase into step (a);
(d) separating said polar, organic solvent from said organic phase by forward extraction with water or an aqueous salt solution and forming a first extract;
(e) separating said hydrogen chloride from said organic phase containing said amine and said non-polar organic solvent and free of said polar organic solvent by heating; and
(f) back extracting said first extract with said hydrogen chloride free organic phase of step (e) to form said water or an aqueous salt solution for feed back to step (d) and a second extract containing said polar, organic solvent, said non-polar, organic solvent and said amine for recirculation to step (a).

12. The method of claim 11, wherein said forward extraction is carried out at a temperature from about 0° to +50° C.

13. The method of claim 12, wherein said forward extraction is carried out at a temperature from +5° to +30° C.

14. The method of claim 13, wherein said back extraction is carried out at a temperature from +50° to +150° C.

15. The method of claim 12, wherein said back extraction is carried out at a temperature from about +30° to +250° C.

* * * * *